United States Patent
Lalji (10) Patent No.: US 7,472,953 B1
(45) Date of Patent: Jan. 6, 2009

(54) VEHICLE SEAT PROTECTOR

(76) Inventor: David Lalji, 1421 Banks Rd., Margate, FL (US) 33063

( * ) Notice: Subject to any disclaimer, the term of this patent is extended or adjusted under 35 U.S.C. 154(b) by 0 days.

(21) Appl. No.: 11/425,621

(22) Filed: Jun. 21, 2006

Related U.S. Application Data (63) Continuation-in-part of application No. 11/130,373, filed on May 16, 2005, now abandoned.

(51) Int. Cl.
*A47C 31/00* (2006.01)
(52) U.S. Cl. .................... 297/224; 297/229
(58) Field of Classification Search ........... 297/218.1, 297/224, 229, 228.11, 219.1, 900, 220; 2/52, 2/48, 50, 46, 60, 221, 49.1, 141.2, 51
See application file for complete search history.

(56) References Cited

U.S. PATENT DOCUMENTS

| | | | | |
|---|---|---|---|---|
| 4,458,738 A | * | 7/1984 | Wilson | 150/154 |
| 4,780,911 A | * | 11/1988 | Mack | 2/49.1 |
| 4,787,099 A | * | 11/1988 | Mack | 2/49.1 |
| 5,618,082 A | * | 4/1997 | Jachmich | 297/229 |
| 6,095,058 A | * | 8/2000 | Earnhart | 108/43 |
| 6,351,869 B1 | * | 3/2002 | Jones | 15/209.1 |

FOREIGN PATENT DOCUMENTS

CN        201039755 Y  *  3/2008

* cited by examiner

*Primary Examiner*—Milton Nelson, Jr.
(74) *Attorney, Agent, or Firm*—Daniel S. Polley, P.A.

(57) ABSTRACT

A protector having a body member positioned over designated portions of a vehicle seat and secured and retained in place by a retaining member. The retaining member can consist of two tie straps. Alternatively, a strap is attached at one end to the body member and removably attached at its other end by a snap assembly, a button/buttonhole assembly or a hook and loop fastening assembly. In another embodiment a hood defining a pocket is attached to one end of the body member to receive a headrest member of the vehicle seat. In a further embodiment, one or more holes can be provided in the body member for disposal around the headrest or post(s) of the headrest member. The body member hangs down from the headrest over a desired portion of the vehicle seat and can be quickly and easily attached/detached and removed.

9 Claims, 9 Drawing Sheets

VEHICLE SEAT PROTECTOR

This application is a continuation-in-part of U.S. application Ser. No. 11/130,373, filed May 16, 2005, now abandoned, which is incorporated by reference.

FIELD OF THE INVENTION

The present invention relates particularly to a seat protector for a vehicle seat.

BACKGROUND OF THE INVENTION

Though car owners often spend significant time and expense in washing and maintaining the exterior and interior surfaces of their vehicles, often the vehicle seats are left unprotected. In the past, seat covers have been fitted around the vehicle seat and are intended to be permanently disposed around the vehicle seat until they are discarded. Accordingly, what is needed in the art is for a vehicle seat cover which can be quickly and easily positioned over a large portion of the vehicle seat and which is also easily removable for washing or where the user does not wish to provide a cover over the vehicle seat. It is therefore to the effective resolution of the above shortcomings that the present invention is directed.

SUMMARY OF THE INVENTION

The present invention provides a vehicle seat protector having a body member which is positioned over designated portions of a vehicle seat and retained or maintained in place by a retaining member. In a first embodiment the retaining portion consists of two tie straps, strings, rope, cord, wire, etc. (collectively referred to as "straps"). In a second embodiment a strap is attached at one end to the body member and removably attached to the body member at a second end by a snap assembly. In a third embodiment a strap is attached at one end to the body member and removably attached to the body member at a second end by a button/buttonhole assembly. In a fourth embodiment a strap is attached at one end to the body member and removably attached to the body member at a second end by a hook and loop fastening assembly. In a fifth embodiment a hood defining a pocket is attached to one end of the body member. The pocket receives a headrest member of the vehicle seat. In a sixth embodiment, one or more holes can be provided in the body member for disposal around the headrest or post(s) of the headrest member. In all embodiments, the body member preferably hangs down from the headrest area over a portion of a back member and a seat member of the vehicle seat. The various attachment and retaining embodiments permit the body member to be quickly and easily attached and removed. Thus, it is convenient to remove the body member for whatever reason (i.e. washing, etc.) as the protector can quickly be reattached to the vehicle seat.

It is an object of the present invention to provide a protector for a seat.

It is another object of the present invention to provide a protector for a vehicle seat.

It is yet another object of the present invention to provide a seat protector which can easily be removed and attached to a seat, such as a vehicle seat.

It is still another object of the present invention to provide a seat protector which can be cleaned and washed.

In accordance with these and other objects which will become apparent hereinafter, the instant invention will now be described with particular reference to the accompanying drawings.

BRIEF DESCRIPTION OF THE DRAWINGS

FIG. 15 is a top view of the sixth embodiment of the present invention showing the body member having a single hole (FIG. 15a) or multiple holes (FIG. 15b);

FIG. 16 is a top view of the sixth embodiment showing a single hole disposed around a single post of a headrest (FIG. 16a) or stretched and disposed around both posts of a headrest (FIG. 16b);

DESCRIPTION OF THE PREFERRED EMBODIMENTS

Figure 1:
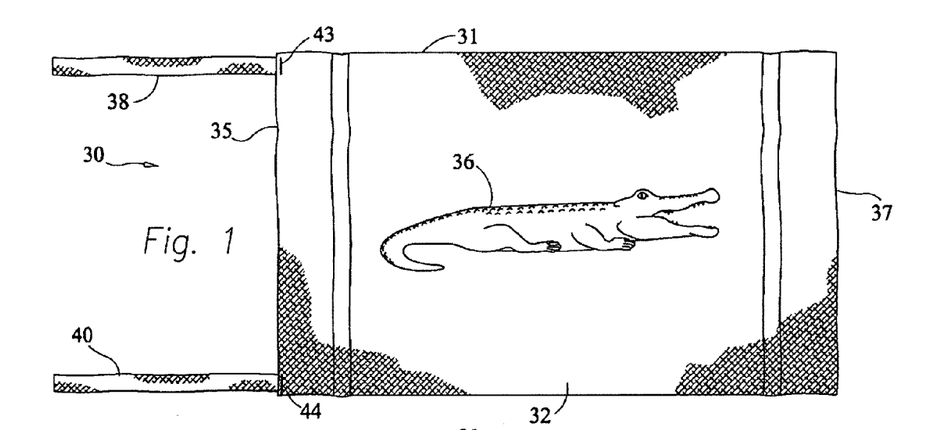
FIG. 1 is a top view of the first embodiment for the present invention incorporating tie straps.
Figure 2:
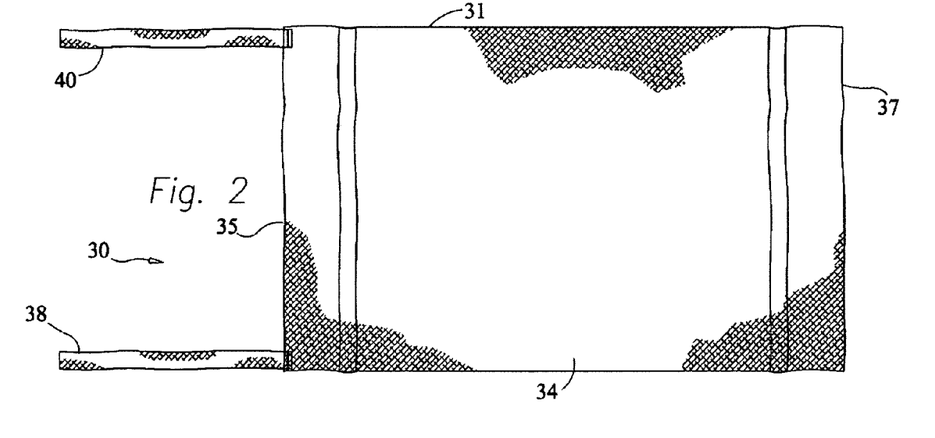
FIG. 2 is a bottom view of the embodiment shown in FIG. 1.
Figure 3:
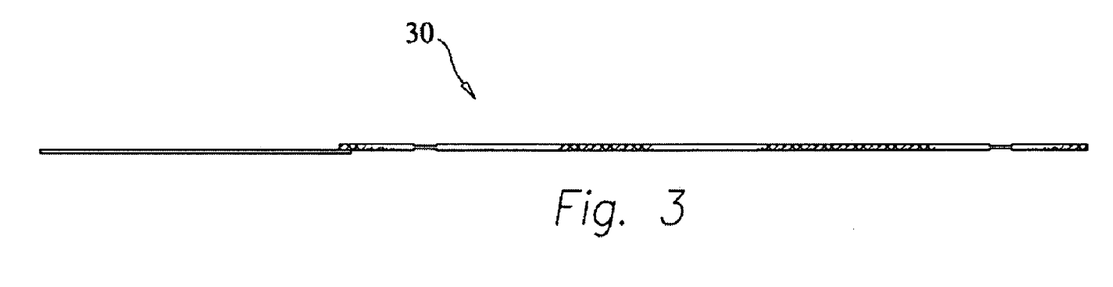
FIG. 3 is a side view of the embodiment shown in FIG. 1.
Figure 4:
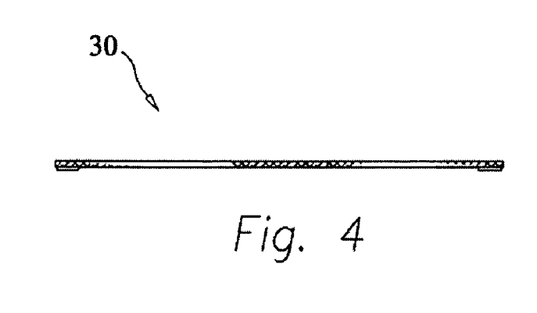
FIG. 4 is a front view showing the embodiment of FIG. 1.

As seen in FIGS. 1-6 a first embodiment of the present invention vehicle seat protector is illustrated and generally designated as protector 30. Protector 30 has a body member 31 having a first surface 32 and a second surface 34. As seen in FIG. 1, a logo, symbol or any other type of indicia 36 (collectively referred to as "indicia") can be incorporated into or otherwise disposed on either or both surfaces 32 and/or 34. Additionally, certain indicia can appear on first surface 32 and different indicia on second surface 34.

Body member 31 also includes a first end 35 and a second end 37. In all embodiments, body member 31 can be very similar to a conventional towel and constructed from similar materials as conventional towels. However, the invention is not limited to towels or towel-like materials and other materials can be used for the construction of body member 31.

Figure 5:
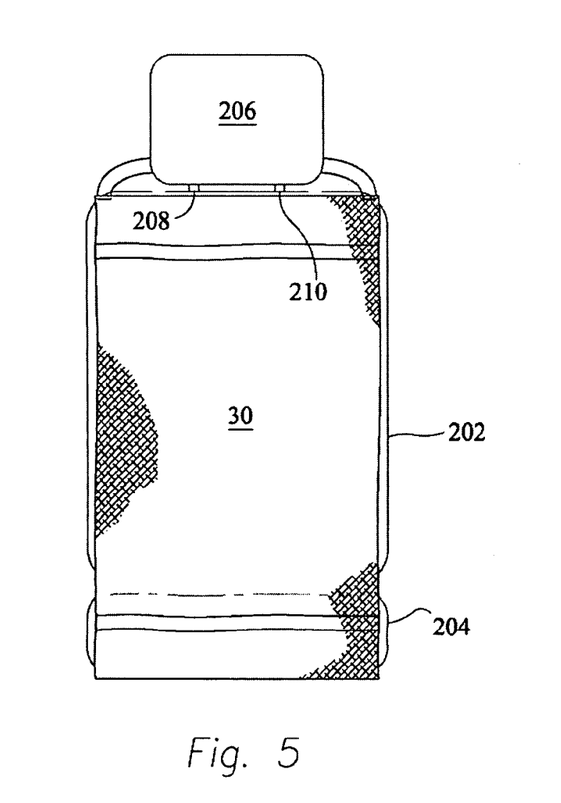
FIG. 5 is a front view showing the first embodiment of the present invention attached to a vehicle C.
Figure 6:
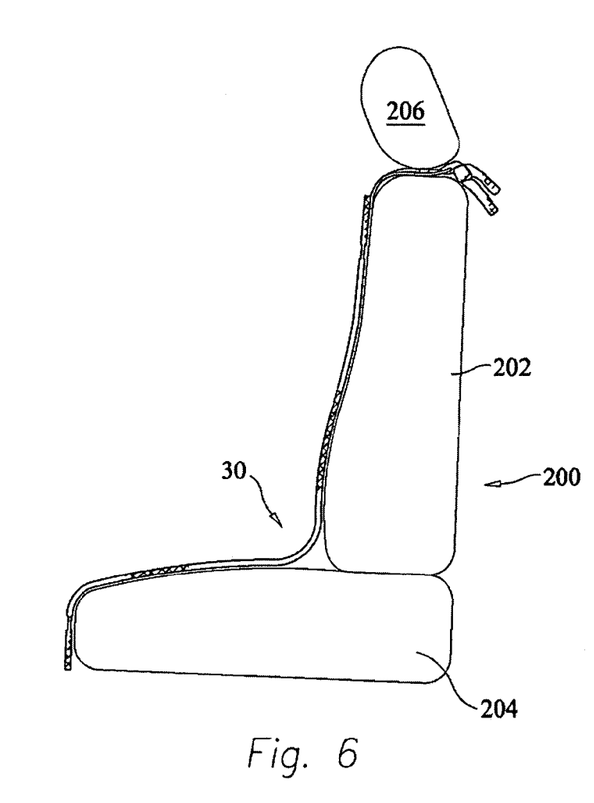
FIG. 6 is a side view illustrating the invention of FIG. 1 attached to a vehicle seat

A first strap 38 and a second strap 40 are properly attached to body member 31 at first end 35. In one embodiment, though not limiting, straps 38 and 40 are attached to body member 31 by stitching 43 and 44, respectively. Straps 38 and 40 can be disposed at top surface 32 and/or bottom surface 34. Straps 38 and 40 can be constructed from any flexible material which will permit the straps to be tied into a knot, bow or any other body member retaining configuration. As seen in FIGS. 5 and 6, in use body member 31 is positioned such that it provides sufficient protection to at least a portion of back member 202 and preferably also a portion of seat member 204 of a vehicle seat 200. Vehicle seat 200 can be a motor vehicle or automobile seat, and the invention is not limited to such, and all the embodiments of the present invention can be used with any type of seat (i.e. aircraft, boat, etc.) which will permit at least one of the various retaining embodiments discussed herein to be used for positioning and retaining body member 31 on the intended seat, including vehicle seat 200.

Once body member 31 is properly positioned with respect to vehicle seat 200, straps 38 and 40 can be tied into a knot, bow, etc. such that the straps are positioned around post 208 and/or 210 of headrest 206 which permits body member 31 to hang down over the relevant portions of back member 202 and seat member 204. Headrest 206 may only have a single post rather than the two posts 208 and 210 shown in FIG. 5, and all embodiments of the present invention can also be used with a single post headrest 206 as well. Furthermore, headrest 206 can also be position such that it abuts the top of back member 202 and straps 38 and 40 can be tied and disposed around headrest 206 itself, as opposed to the single or double post of headrest 206.

It should also be recognized that the straps can be positioned along the top of back member 202, and headrest 206 positioned such that it abuts back member 202 and sandwiches straps 38 and 40 to retain straps 38 and 40 and without requiring that straps 38 and 40 be tied or otherwise connected to each other.

Figure 7:
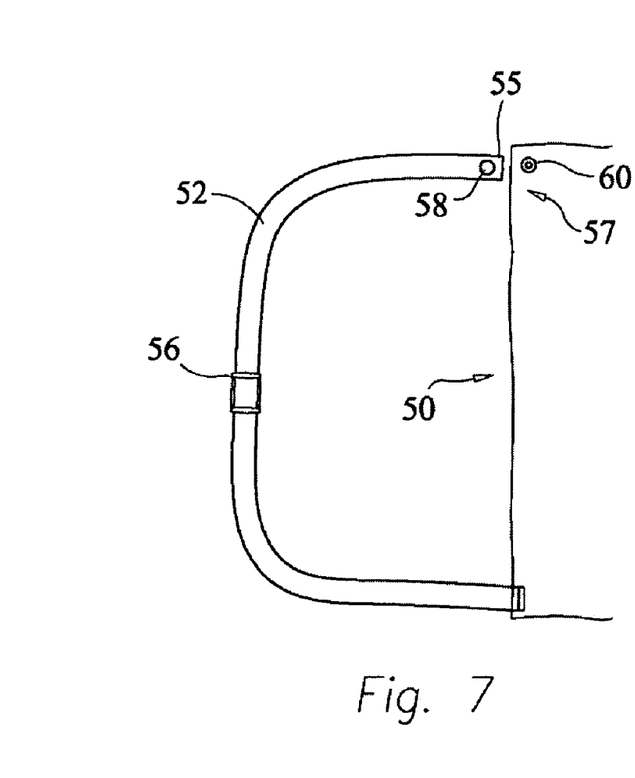
FIG. 7 is a top view of the second embodiment for the present invention having an adjustable strap buckle.
Figure 8:
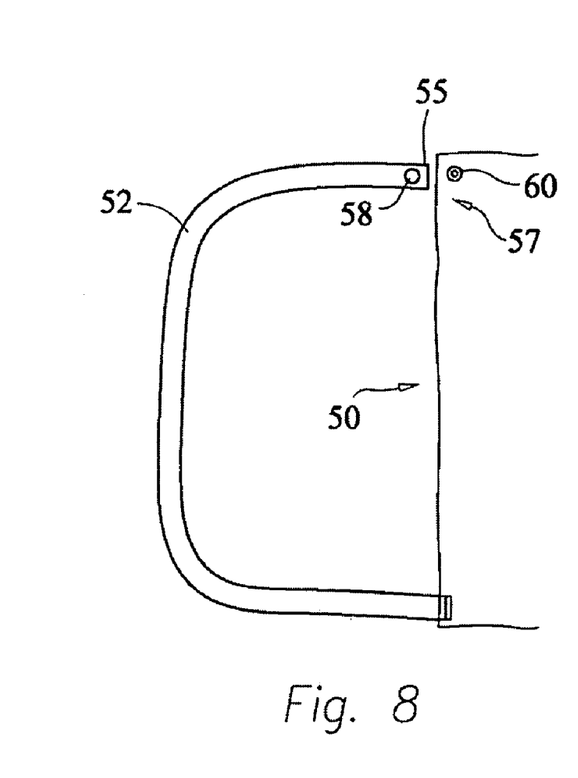
FIG. 8 is a top view of the second embodiment of the invention without the adjustable buckle.

FIGS. 7 and 8 illustrate the second embodiment of the present invention seat protector which is generally designated as reference numeral 50. The vehicle seat shown for this embodiment and all remaining embodiments is similar to or the same as vehicle seat 200 and thus, will have like reference numerals as vehicle seat 200. Furthermore, the body member (including indicia/logo) of the second embodiment and the remaining embodiments can be similar to body member 31 (and indicia/logo 36) of the first embodiment and, thus, are given the same reference numeral.

The seat protector 50 includes a body member 31 in which a strap 52 can be attached at one end at above member 31. Any conventional way of attaching strap 52 to body member 31 is considered within the scope of the invention, in addition to the stitching shown in FIGS. 7 and 8.

A snap assembly 57 can be provided including a first female receiving member 58 which can be attached approximately at or adjacent to the second end 55 of strap 52 and a second male portion 60 which can be disposed on body member 31. It is also the scope of the invention that the female portion 58 of snap assembly 57 can be provided on body member 31 and male portion 60 of snap assembly 57 can be provided at second end 55 of strap 52. Additionally a plurality of female portions 58 and/or male portions 60 can be provided to permit strap 52 to be adjustably attached by the connection of one of the male portions 60 with one of the female portions 58. Additionally or alternatively, a buckle 56 or tri-glide can be provided on strap 52 for adjusting the length of strap 52.

Similar to the first embodiment of the present invention, once end 55 is attached to body member 31 through snap assembly 57, strap 52 is secured to vehicle seat 200 at head rest 206 and body member 31 is retained in position over the relevant portions of back member 202 and seat member 204 of vehicle seat 200. Selectively end 55 can be attached to body member 31 prior to positioning body member 31 over back member 202 and seat member 204 or after body member 31 has been positioned over such members (202 and 204) of vehicle seat 200.

Figure 9:
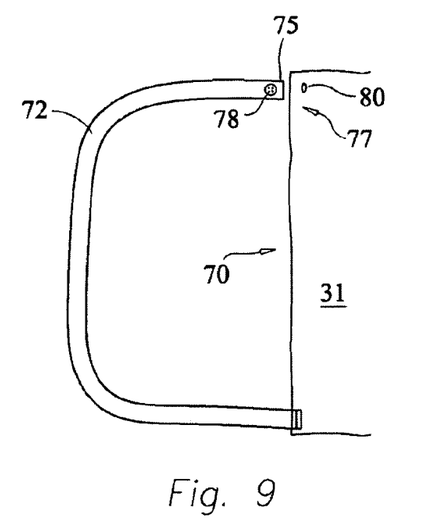
FIG. 9 is a top view of a third embodiment of the present invention.
Figure 10:
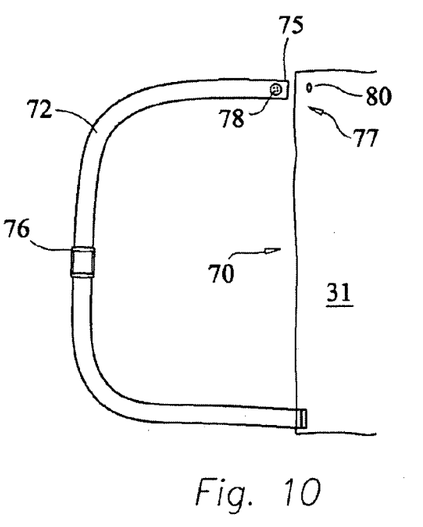
FIG. 10 is a top view of the third embodiment of the present invention having an adjustable buckle.

As seen in FIGS. 9 and 10, the third embodiment seat protector is generally designated as reference numeral 70 and includes a body member 31 in which a strap 72 is attached at one end of body above member 31. Similar to the other embodiments, any conventional way of attaching strap 72 to body member 31 is considered within the scope of the invention, in addition to the stitching shown in FIGS. 9 and 10.

A button/buttonhole assembly 77 can be provided including a button 78 which can be attached approximately at or adjacent to the second end 75 of strap 72 and a buttonhole 80 which can be disposed on body member 31. It is also the scope of the invention that button 78 be provided on body member 31 and buttonhole 80 be provided at second end 75 of strap 72. Additionally a plurality of buttons 78 and/or buttonholes 80 can be provided to permit strap 72 to be adjustably attached by the connection of one of the buttons 78 with one of the buttonholes 80. Additionally or alternatively, a buckle or tri-glide 76 can be provided on strap 72 for adjusting the length of strap 72.

Similar to the first embodiment of the present invention, once end 75 is attached to body member 31 through button/buttonhole assembly 77, strap 72 is secured to vehicle seat 200 at head rest 206 and body member 31 is retained in position over the relevant portions of back member 202 and seat member 204 of vehicle seat 200. Selectively end 75 can be attached to body member 31 prior to positioning body member 31 over back member 202 and seat member 204 or after body member 31 has been positioned over such members (202 and 204) of vehicle seat 200.

Figure 11:
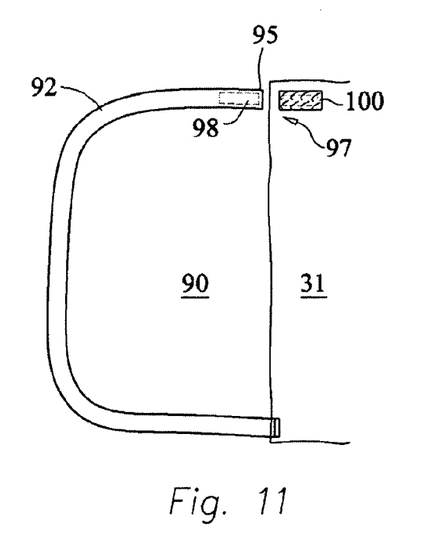
FIG. 11 is a top view of the fourth embodiment of the present invention.
Figure 12:
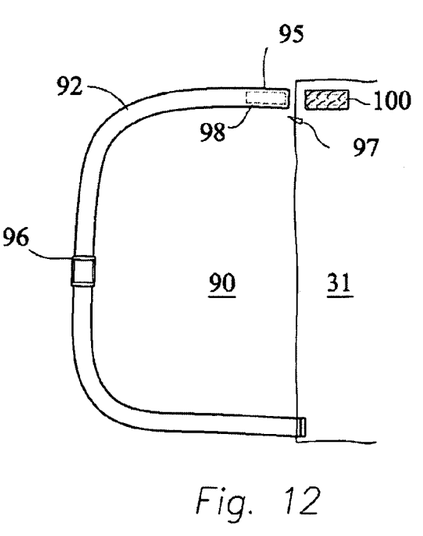
FIG. 12 is a top view of the fourth embodiment of the present invention having an adjustable strap buckle.

FIGS. 11 and 12 illustrate a fourth embodiment generally designated as reference numeral 90 includes a body member 31 in which a strap 92 is attached at one end at above member 31. Any conventional way of attaching strap 92 to body member 31 is considered within the scope of the invention, in addition to the stitching shown in FIGS. 11 and 12.

A hook and loop fastening assembly 97 is provided including a first hook and/or loop portion 98 which can be attached approximately at or adjacent to second end 95 of strap 92 and a second hook and/or loop portion 100 which can be disposed on body member 31. Additionally a plurality of first hook and/or loop portions 98 and/or second hook and/or loop portions 100 can be provided to permit the strap to be adjustably attached by the connection of one of the first portions 98 with one of the second portions 100. In lieu of a plurality of first and/or second portions 98 and 100, respectively, the length of the first and/or second portions can be extended to provide an elongated attachment area. Additionally, a buckle or tri-glide 96 can be provided on strap 92 for adjusting the length of strap 92.

Similar to the first embodiment of the present invention, once end 95 is attached to body member 31 through hook and loop fastening assembly 97, strap 92 is secured to vehicle seat 200 at head rest 206 and body member 31 is retained in position over the relevant portions of back member 202 and seat member 204 of vehicle seat 200. Selectively end 95 can be attached to body member 31 prior to positioning body member 31 over back member 202 and seat member 204 or after body member 31 has been positioned over such members (202 and 204) of vehicle seat 200.

Figures 13, 14:
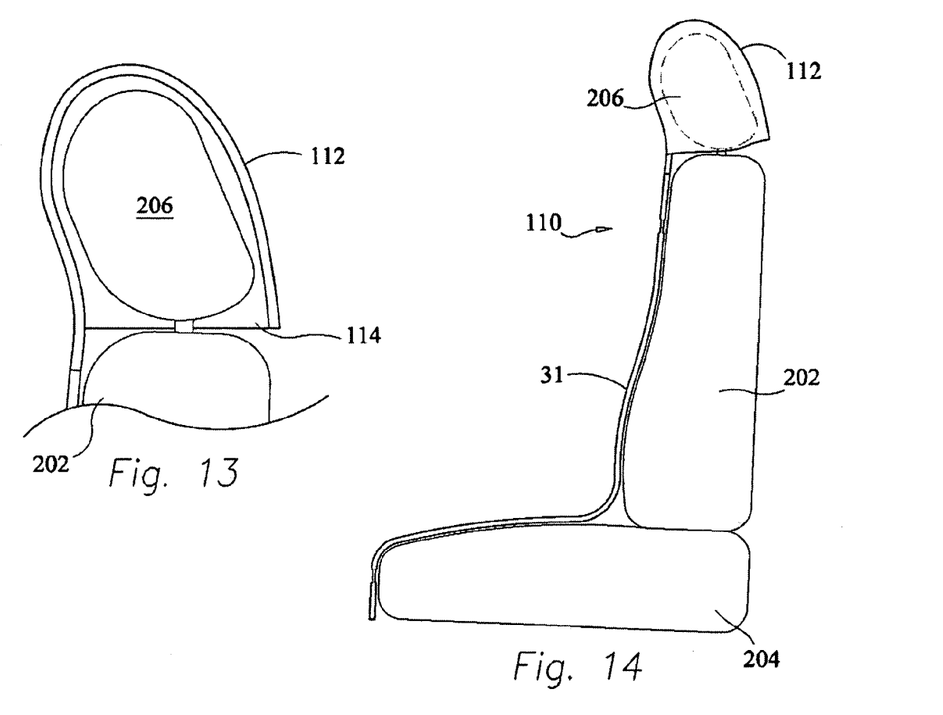
FIG. 13 is a partial side-sectional view illustrating the fifth embodiment of the present invention.
FIG. 14 is a side view illustrating the fifth embodiment of the present invention shown attached to a vehicle seat.
Figure 15A:
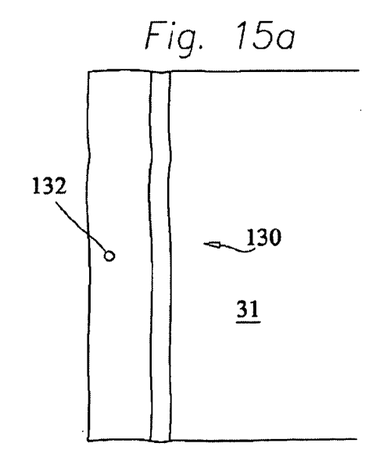
Figure 15B:
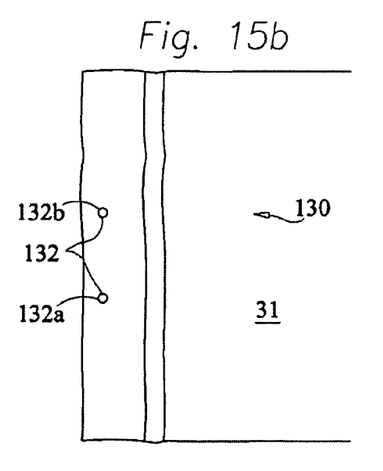
Figure 16A:
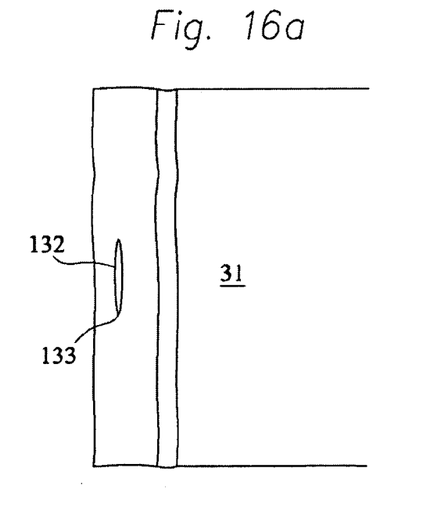
Figure 16B:
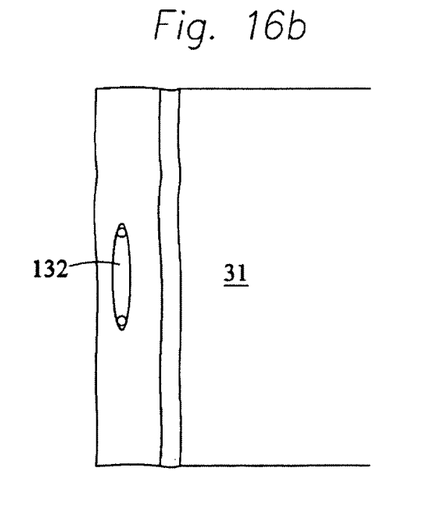
Figure 17:
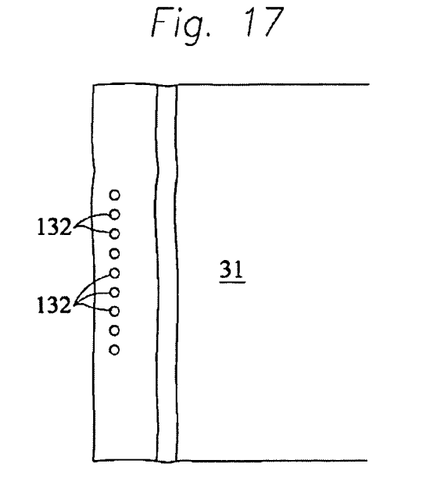
FIG. 17 is a top view of the sixth embodiment showing multiple holes disposed around associated posts of a headrest.
Figure 18:
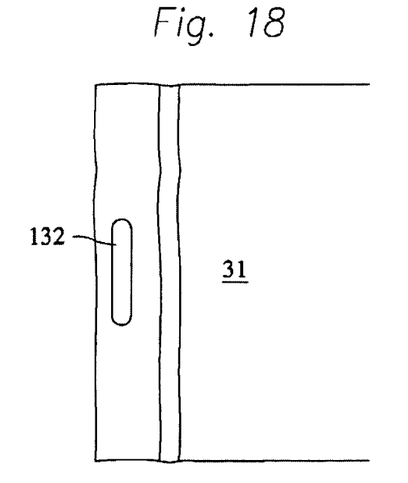
FIG. 18 is a top view of the sixth embodiment showing a single hole stretched around a headrest.
Figure 19:
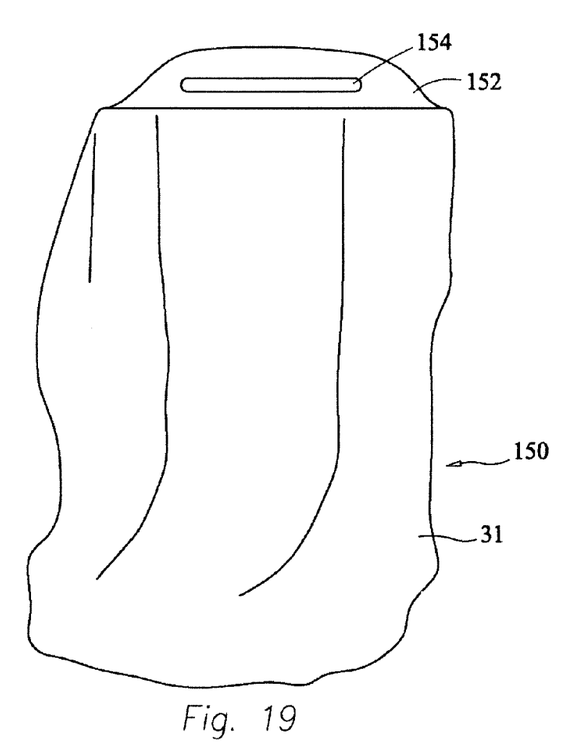
FIGS. 19-22 illustrate several view of a seventh embodiment of the present invention.
Figures 20, 21:
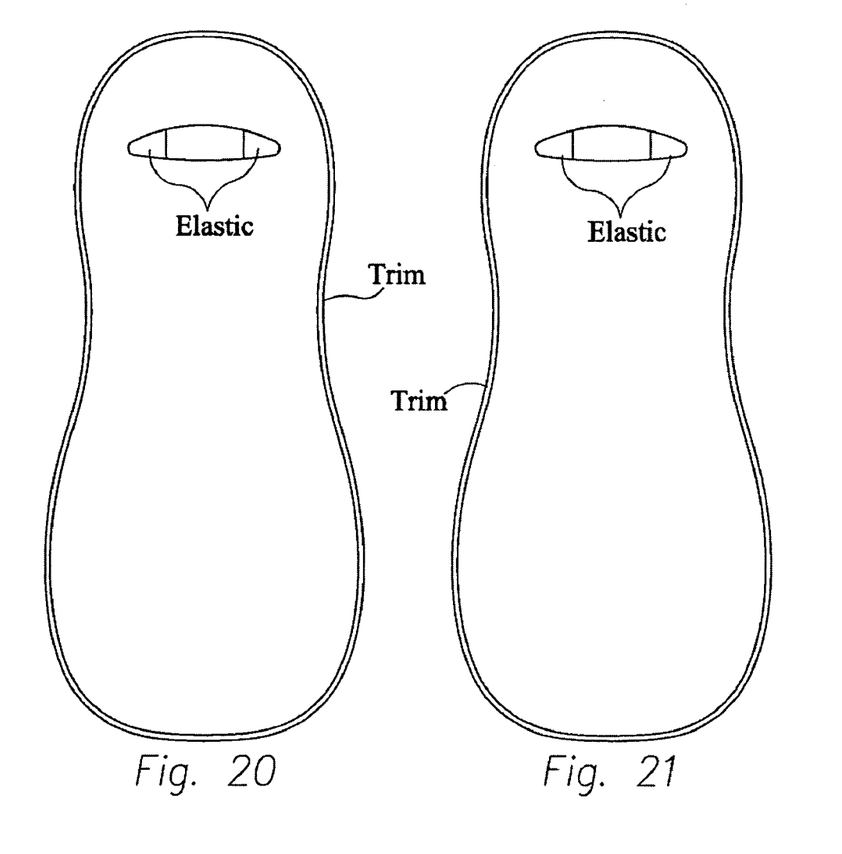
Figure 22:
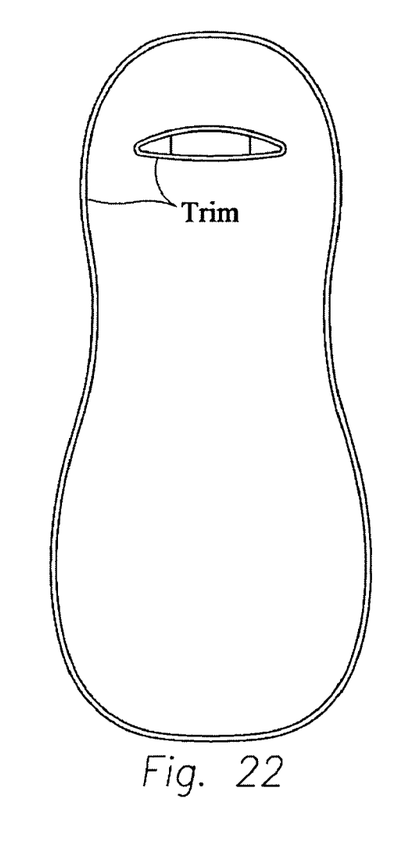

FIGS. 13 and 14 illustrate a fifth embodiment of the present invention seat protector which is generally designated as reference numeral 110. As seen in this embodiment, body member 31 can be provided with a hood 112 attached at one end to define a headrest receiving pocket 114. Hood 112 can be constructed integral with body member 31 and/or monolithically form with body member 31. Alternatively, hood 112 can be attached to body member 31 by conventional means such as, but not limited to, stitching. As seen in FIG. 14, in use headrest 206 is inserted within receiving pocket 114 which causes body member 31 to properly hang down and protect the designated portions of back member 202 and seat member 204 of vehicle seat 200.

FIGS. 15-18 illustrate a sixth embodiment for the invention. This embodiment is generally designated as reference numeral 130. Body member 31 is provided with one or more holes, slots, apertures, etc. 132 (collectively referred to as "hole" or "holes"). A single hole 132 can be provided for disposal around headrest 206 or one or more headrest post. Alternatively, where two headrest posts are provided, two holes 132a and 132b can be provided (one for each headrest post). In all versions, the attachment of body member 31 to headrest 206 or headrest posts causes the remaining portion of body member 31 to properly hang over desired portions of vehicle seat 200.

Hole 132 can correspond substantially to the size of headrest 206 such that headrest 206 can be inserted therethrough. Alternatively, size of holes 132 can be sized corresponding to the head post associated with the headrest. When hole 132 is associated with a post, hole 132 is aligned over the head post receiving slot typically located at the top of back portion 202 and then the headrest post is inserted through hole 132 and the post receiving slot. Thus, once headrest 206 is attached to back portion 202 of vehicle seat 200, body member 31 is retained in position and cannot be removed without first disconnecting headrest 206 from its connection with back portion 202. Attaching to the post of a two post headrest would be similar.

Hole(s) 132 can be provided with an elastic portion 133 around their perimeter, which can allow the hole(s) to be stretched to various different sizes. With elastic portion 133, the size of hole 132 in a non-stretched position, can be much smaller, and then stretched to a sufficient size to received headrest 206. Furthermore, elastic portion 133 provides a tighter fit or connection of hole 132 around headrest 206 or the headrest post(s).

FIGS. 19-22 illustrate another embodiment for the present invention which is similar to the embodiments in FIGS. 15-18 is generally designated protective cover 150. Cover 150 includes a body member 31, which is attached by conventional means (i.e. stitching, etc.) to a stretchable portion 152 such as, but not limited to, a stretchable fabric. A hole or slit 154 is provided in portion 154 for receipt of headrest 206 or the headrest posts. In lieu of, or in addition to, portion 152 being stretchable, an elastic member can be disposed around the perimeter edge of hole or slit 154 for adjusting the size of hole or slit 154. Thus, the elastic member acts as a reinforcement to conform hole/slit 154 to headrest 206. The elastic member or elastic band can be positioned around the upper or encircle the entire hole/slit 154. A portion of the perimeter can also be provided with an elastic member or band, such as, but not limited to, in the corners or ends of the hole, which can be, elliptical in shape, though such is not considered limiting.

In all of the above embodiments, body member 31 can be preferably sufficiently sized to provide protection to the portions of vehicle seat 200 which commonly come in contact with the individual sitting on vehicle seat 200. Thus, when the individual returns from the beach, from a swimming pool, has sweat retained on its body surface or clothing from exercising, etc. the present invention protects the seat from being exposed to such elements. Furthermore, the present invention can be used to protect seat 200 from spills and/or other stains.

As body member 31 is preferably constructed from similar materials use to construct conventional towels, body member 31 can be easily washed, along with its attached retaining means, in a conventional washer and dryer after one or more uses.

Additionally, it should also be recognized that various strap members disclosed above do not have to be permanently attached to body member 31. For example, in the second embodiment, snap assemblies 57 can be provided at both ends of strap 52 for connecting both ends to body member 31. Likewise in the third embodiment, two button/buttonhole assemblies 77 can be provided to attach both ends of strap 72 to body member 31. Similarly, in the fourth embodiment, two hook and loop fastening assemblies 97 can be provided for attaching both ends of strap 92 to body member 31. Thus, where the strap is removably attached to body member 31, the strap can be detached from body member 31 prior to washing body member 31. Furthermore, it is also within the scope of the invention that the various retaining embodiments can be used together. For example one end of the strap can be attached to body member 31 by snap assembly 57 while the other end of the strap can be attached to body member 31 by button/buttonhole assembly 77 or hook and loop fastening assembly 97. All other combinations are also available and are within the scope of the invention.

It should also be recognized that in all of the above-described embodiments (excluding the embodiment shown in FIGS. 13 and 14) the retaining means used to position body member 31 over the desired portion of vehicle seat 200 can be used with headrest 206 or the post(s) of headrest 206.

It should be further recognized that the present invention can be used to protect various different types of seats. Accordingly, though a headrest is discussed, another portion of a seat which would permit the tie straps (38/40), strap (52, 72, 92), hood 112 and/or hole(s) 132 to secure body member 31 can be protected by the present invention and is considered within the scope of the invention.

Furthermore, though not shown, in lieu of the button/button hole, hook and loop fastener, and/or snap assemblies described above, a buckle assembly can be provided for attaching the strap (52, 72, 92) to body member 31. Any conventional buckle can be used, such as, but not limited to a side release buckle. The buckle can have a male portion attached to either the strap or body member 31 and a mating female portion attached to the body member 31 or the strap (depending on which portion the male portion is attached to).

The various embodiments discussed above retain and hang a portion of body member 31 substantially downward over a desired portion of at least back member 202. Preferably, another portion of body member 31 rests over a desired portion of seat member 204. Substantially downward is defined to include any angle position body member 31 may be disposed at based on the angle position back member 202 and/or headrest 206 may be disposed at with respect to seat member 204.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A seat protector towel for a vehicle seat, the vehicle seat having a seat member, back member and a headrest, said seat protector towel comprising:

a strapless towel having a first end, a second end, a first surface and a second surface, said towel constructed from one or more materials used to construct ordinary beach towels; and an aperture defined by said towel, said aperture adapted for insertion therethrough of a vehicle headrest without damaging the towel, wherein in an unfolded configuration for said towel said aperture is disposed adjacent to the first end of said towel and provides for a quick attachment and quick detachment of the towel from the headrest, said aperture providing a sole securement point for said towel to the vehicle seat;

a first elastic member disposed at one end of and within said aperture; and a second elastic member disposed at a second end of and within said aperture;

wherein a lower portion of said towel is wider in dimension than an upper portion of said towel;

wherein said towel is adapted for securement to said headrest in a loose configuration and without any other attachment or securement points for the towel to the vehicle seat.

2. The seat protector towel of claim 1 wherein said aperture is substantially elliptical in shape.

3. The seat protector towel of claim 1 wherein said towel having a first surface and a second surface and at least the first surface of said towel member having indicia disposed thereon.

4. A seat protector towel for a vehicle seat, the vehicle seat having a seat member, back member and a headrest, said seat protector towel comprising:

a towel having a first end, a second end, a first surface and a second surface, said towel constructed from one or more materials used to construct ordinary beach towels; and an aperture defined by said towel, said aperture adapted for insertion therethrough of a vehicle headrest without damaging the towel, wherein in an unfolded configuration for said towel said aperture is disposed adjacent to the first end of said towel and provides for a quick attachment and quick detachment of the towel from the headrest, said aperture providing a securement point for said towel to the vehicle seat;

a first elastic member disposed at one end of and within said aperture; and a second elastic member disposed at a second end of and within said aperture;

wherein a lower portion of said towel is wider in dimension than an upper portion of said towel.

5. The seat protector towel of claim 4 wherein said towel is adapted for securement to said headrest in a loose configuration and without any other attachment or securement points for the towel to the vehicle seat.

6. A seat protector towel for a vehicle seat, the vehicle seat having a seat member, back member and a headrest, said seat protector towel comprising:

a strapless towel having a first end, a second end, a first surface and a second surface; and an aperture defined by said towel, said aperture adapted for insertion therethrough of a vehicle headrest without damaging the towel, wherein in an unfolded configuration for said towel said aperture is disposed adjacent to the first end of said towel and provides for a quick attachment and quick detachment of the towel from the headrest, said aperture providing a sole securement point for said towel to the vehicle seat;

a first elastic member disposed at one end of and within said aperture; and a second elastic member disposed at a second end of and within said aperture;

wherein a lower portion of said towel is wider in dimension than an upper portion of said towel;

wherein said towel is adapted for securement to said headrest in a loose configuration and without any other attachment or securement points for the towel to the vehicle seat.

7. The seat protector towel of claim 6 wherein at least the first surface of said strapless towel having indicia disposed thereon.

8. A seat protector towel for a vehicle seat, the vehicle seat having a seat member, back member and a headrest, said seat protector towel comprising:

a towel having a first end, a second end, a first surface and a second surface; and an aperture defined by said towel, said aperture adapted for insertion therethrough of a vehicle headrest without damaging the towel, wherein in an unfolded configuration for said towel said aperture is disposed adjacent to the first end of said towel and provides for a quick attachment and quick detachment of the towel from the headrest, said aperture providing a securement point for said towel to the vehicle seat;

a first elastic member disposed at one end of and within said aperture; and a second elastic member disposed at a second end of and within said aperture;

wherein a lower portion of said towel is wider in dimension than an upper portion of said towel.

9. The seat protector towel of claim 8 wherein said towel is adapted for securement to said headrest in a loose configuration and without any other attachment or securement points for the towel to the vehicle seat.

* * * * *